Dec. 31, 1963 D. R. CRAIG ETAL 3,115,807

ELECTRONIC MASKING

Filed June 17, 1960

INVENTORS
DWIN R. CRAIG &
JOHN N. STREET

BY Raymond W. Colton

ATTORNEY

United States Patent Office 3,115,807
Patented Dec. 31, 1963

3,115,807
ELECTRONIC MASKING

Dwin R. Craig, Falls Church, and John N. Street, Arlington, Va., assignors to Logetronics, Inc., Alexandria, Va., a corporation of Delaware Filed June 17, 1960, Ser. No. 36,910
16 Claims. (Cl. 88—24)

Figures 1, 2:
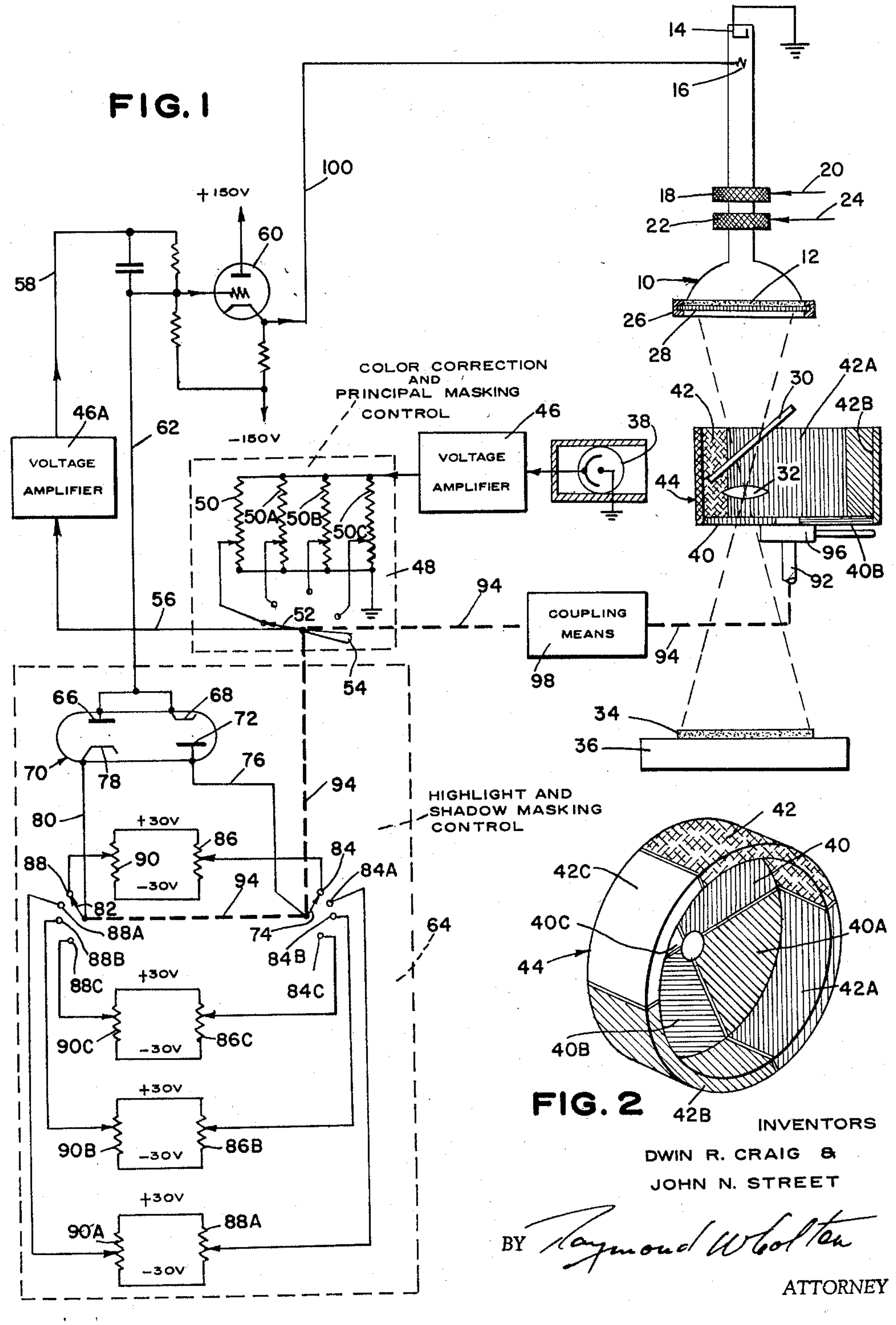

This invention relates to the achievement electronically of results heretofore requiring the use of photographic masking.

The present invention contemplates methods and apparatus for achieving principal masking, highlight masking, shadow masking, and/or color correction masking in the production of photographic prints, including color separations.

Conventional photographic masking is a very time consuming and expensive procedure, for which there has been no complete substitute until now. Principal masking alone has been achieved electronically as disclosed by British Patent No. 713,285 in the name of Radio Corporation of America, published August 11, 1954 and by the U.S. patent to Craig, No. 2,842,025, dated July 8, 1958. Neither of these disclosures, nor any others known at this time, has provided a solution for highlight masking or shadow masking applicable to black and white as well as color printing, or for color correction masking of the type required for the production of color separations.

According to the present invention, the principal masking of the prior art has been retained and provisions have been made to introduce additionally, electronic highlight masking, electronic shadow masking, and electronic color correction masking. These results are produced by the use of a cathode ray tube as a scanning light source to illuminate a transparency and form a real image thereof on a photosensitive emulsion. A portion of the light traversing the transparency is sensed by a photoelectric device included in an inverse feedback loop connected to a control electrode of the cathode ray tube and the output of the photoelectric device is preferably converted to a logarithmic function. Highlight and/or shadow masking are achieved by limiting the range of the feedback voltage so that in effect, masking will occur only between such limits as the operator selects. Color correction masking is achieved by introducing in the path of light impinging on the photoelectric device, a filter bearing a predetermined relationship to a color separation filter lying in the optical path of the image forming light.

It is among the objects of the present invention to provide photographic masking apparatus comprising a cathode ray tube having a control electrode and a substantially homogeneous white light emitting surface for producing a scanning beam; means defining an optical path for light from the beam including means for supporting a transparency adjacent the surface, means for supporting a light sensitive emulsion remote from the surface, optical projecting means between the supporting means, and means for mounting a color separation filter between the supporting means; means defining a second optical path for light from the beam including a beam splitter between the transparency supporting means and the color separation mounting means, a photoelectric device sensitive to light substantially throughout the visible spectrum, and means for supporting a masking filter between the beam splitter and the photoelectric device; and an inverse feedback loop interconnecting the sensing device and the control electrode. The feedback loop preferably includes an adjustable clipping circuit for limiting the range of feedback voltage applied to the electrode. This clipping circuit preferably limits the maximum and minimum values of feedback voltage range applied to the electrode. Substantially complementary color separation and masking filters are preferably carried by the filter supporting means and a plurality of sets of such complementary filters are preferably employed so as to be sequentially used in the production of color separations.

It is also among the objects of the present invention to provide photographic masking apparatus comprising a cathode ray tube having a control electrode and a fluorescent surface for producing a scanning cone of light; a portion of the light traversing an optical path including means for supporting a transparency and means beyond the transparency for supporting a light sensitive emulsion to receive an image of the transparency; a photoelectric device in the path of at least a portion of the light passing through the transparency; and an inverse feedback loop interconnecting the photoelectric device and the control electrode, the loop including an adjustable clipping circuit for limiting the range of feedback voltage applied to the electrode. The clipping circuit preferably limits the minimum value of the voltage range as well as the maximum value and may include a pair of diodes having variable bias voltages of opposite polarities for this purpose.

A photographic masking method conforming to the present invention comprises scanning a color transparency with a cone of light and projecting a real image thereof on a photosensitive emulsion, sensing a portion of the light traversing the transparency and controlling the intensity of the scanning light as an inverse function of the intensity sensed, and introducing dissimilar color filters in the paths of the image forming light and the sensed light respectively. These color filters may be substantially complementary and may be substituted in pairs as the different color separations are to be produced.

It is also among the objects of the invention to provide a photographic masking method comprising scanning a transparency with a cone of light and exposing a photosensitive emulsion therewith through a transparency, sensing a portion of the light traversing the transparency and controlling the intensity of the scanning light over a predetermined range as an inverse function of the intensity sensed, and adjusting the range to introduce masking. The minimum value of the range may be adjusted and/or the maximum value of the range may be adjusted so as to provide individually or jointly, highlight masking and shadow masking.

A more complete understanding of the invention will follow a description of the accompanying drawings wherein:

FIG. 1 is a diagrammatic illustration of a circuit and related equipment exemplifying the present invention; and FIG. 2 is a somewhat diagrammatic perspective view depicting optical filters of the types contemplated and a manner in which they can be mounted.

A cathode ray tube 10 provided with a substantially homogeneous white light emitting fluorescent surface 12 is provided with a cathode 14, a control electrode or grid 16, a horizontal deflecting winding 18 having a supply lead 20 and a vertical deflecting winding 22 having a supply lead 24. Adjacent the fluorescent surface 12 of the cathode ray tube there is arranged a support 26 for a transparency 28 to be scanned by the light produced by the cathode ray tube. Light thus produced will follow a first optical path including the transparency 28, a beam splitter 30, optical projecting means depicted as a lens 32 and form a real image on a photosensitive emulsion 34 carried by a support 36. A portion of the light passing through the transparency 28 will follow a second optical path by reflection from the beam splitter 30 to a photoelectric device 38 which will preferably assume the form of a photomultiplier tube. Interposed in the first light path there is a color separation filter 40 and in the second light path there is a masking filter 42. These filters, may be arranged in a form somewhat as that depicted in FIG. 2, wherein a drum 44 carries a plurality of pairs of filters, designated 40 and 42, 40A and 42A, 40B and 42B, and 40C and 42C. Inasmuch as the desired colors of the individual filters might be varied to conform with procedures preferred by particular operators, it will be preferable to mount the filters in a replaceable fashion so that different filters can be substituted readily.

The photomultiplier tube 38 may have its dynodes connected in a manner to produce a logarithmic function of the light intensity which it senses, or if its output is linear, then a logarithmic function can be introduced by a voltage amplifier 46 connected to the output of the photomultiplier tube. In any event, the output of the voltage amplifier 46 is preferably a logarithmic function of the light intensity sensed by the photoelectric device 38, and is supplied to the peripheral masking control 48 including four potentiometers 50, 50A, 50B and 50C whose adjustable taps are led to terminals for engagement by a switch arm 52 operated by a suitable handle 54. The switch arm 52 is connected by a lead 56 to the output stage of the voltage amplifier 46A which may be a part of the voltage amplifier 46. The output of the voltage amplifier 46A is connected through a lead 58 to a cathode follower 60 to whose grid there is also connected by means of a lead 62, a clipping circuit 64 serving as a highlight and shadow masking control. The lead 62 is connected to an anode 66 and a cathode 68 of a double diode 70 whose other anode 72 is connected to a switch arm 74 through a lead 76 and whose other cathode 78 is connected through a lead 80 to a switch arm 82. The switch arm 74 may be selectively connected to any of taps 84, 84A, 84B or 84C connected respectively to the adjustable taps of shadow control potentiometers 86, 86A, 86B and 86C. Similarly, the switch arm 82 selectively engages the terminals 88, 88A, 88B and 88C connected respectively to the adjustable taps of potentiometers 90, 90A, 90B and 90C. Thus the switch arm 82 selects the highlight control corresponding to a particular pair of filters used in preparing one of the color separations.

The switch arms 52, 74 and 82 have been depicted as interconnected by a heavy broken line indicating a coupling 94 by which they can be adjusted simultaneously to assume corresponding selected positions. Also connected to this system of switch arms is the shaft 92 of the rotary filter support 44 mounted in a bearing 96. Suitable coupling means 98 can be introduced between the shaft 92 and the switch arm assembly to provide for any differences in angular movements required by sequential adjustments.

The highlight and shadow masking control serves to limit the output voltage range of the feedback loop so that the inverse feedback voltage supplied through the lead 100 to the control grid 16 of the cathode ray tube will be an inverse feedback which can protect the highlights or shadows, or both in the production of prints whether they be black and white or color separations.

Conventional color separation filters, red, green and blue, have been designated by appropriate lining in the drawings and the respective masking filters have been designated similarly. These filters are chosen to correspond with those used in existing practice and their selection may vary from one application to another in accordance with the subject being reproduced, the type of printing ink to be used, the characteristics of the dyes in the transparency, the type of paper on which the final reproduction will be printed, and personal preference. For example, an orange masking filter might be used with the red separation filter. A magenta masking filter may be used when making the green separation. A green masking filter may be used when making the blue separation filter. Choice of filter combination in accordance with this invention still remains within the option of the operator and partially determines kind of color correction which will be achieved.

Amplification of the signal between the photoelectric device and the cathode ray tube is continuously variable from zero to a very large value approaching infinity which would correspond with a hundred percent masking. Choice of the amplification factor corresponds to the value of gamma which is achieved by development with conventional photographic masking. It is rather common to make a mask whose density range is approximately fifty percent of the density range of the transparency measured between a pair of neutral points in the transparency. This amplification is controlled by the principal masking control 48.

The highlight and shadow masking control modifies the shape or transfer characteristic of the feedback signal. A pair of biased diodes prevent compression of the highlight and shadow areas so that the highly desired inverted S characteristic curve can be achieved throughout an entire family of curves wherein brightness of individual points in a picture are plotted against the transmission of the transparency being reproduced.

It has been found that the use of single layer phosphors deposited on the face of the cathode ray tube, which phosphors are composed of a finely ground mixture of individual phosphors, each component emitting over a narrow band of the spectrum, permitting the cathode ray tube face to be far enough out of the focal plane of the transparency so that the individual crystals do not appear as discrete light sources, but close enough to the focal plane so that the cathode ray tube image exhibits resolution comparable to that of an unsharp photographic mask, produces highly desirable results. The present invention also renders it possible to use a single photoelectric device and a single feedback loop to achieve the desired results, eliminating the errors inherent to prior art devices employing separate loops for the different color separations.

It will be understood that the clipping circuit need not rely upon diodes, but can employ other non-linear elements capable of limiting the range of feedback voltage in either a rectilinear or curvilinear fashion or a combination thereof.

Whereas the switch arms 74 and 82 have been described as selecting the shadow and highlight masking values respectively, these functions would be reversed if a negative transparency were substituted for a positive transparency assumed to have been located in the support 26.

Whereas the invention has been described with respect to a single specific embodiment, such variations as will be suggested to those skilled in the art are contemplated by the accompanying claims. For example, certain of the principles of the present invention are equally applicable to contact printing, direct duplication of color transparencies, production of color prints on paper from negative transparencies, production of color negatives from positive transparencies, and production of positive or negative color separations on film, glass or paper, at a reduced or enlarged scale, for subsequent reproduction by photoengraving, lithography, gravure or dye transfer processes.

We claim:

1. Photographic masking apparatus comprising a cathode ray tube having a control electrode and a substantially homogeneous white light emitting surface for producing a scanning beam; means defining an optical path for light from said beam including means for supporting a transparency adjacent said surface, means for supporting a light sensitive emulsion remote from said surface, optical projecting means between said supporting means, and means for mounting a color separation filter between said supporting means; means defining a second optical path for light from said beam including a beam splitter between said transparency supporting means and said color separation filter mounting means, a photoelectric device sensitive to light substantially throughout the visible spectrum intercepting substantially all light in said second path, and means for supporting a masking filter between said beam splitter and said photoelectric device; and an inverse feedback loop interconnecting said sensing device and said control electrode.

2. Photographic masking apparatus according to claim 1 wherein said loop includes an adjustable clipping circuit for limiting the range of feedback voltage applied to said electrode.

3. Photographic masking apparatus according to claim 1 wherein said loop includes an adjustable clipping circuit for limiting the maximum and minimum values of feedback voltage range applied to said electrode.

4. Photographic masking appaartus according to claim 1 wherein substantially complementary color separation and masking filters are carried by said filter supporting means.

5. Photographic masking apparatus according to claim 1 wherein a plurality of sets of color separation and masking filters of substantially complementary colors respectively are caried by said filter supporting means.

6. Photographic masking apparatus comprising a cathode ray tube having a control electrode and a fluorescent surface for producing a scanning cone of light; a portion of said light traversing an optical path including means for supporting a transparency and means beyond said transparency for supporting a light sensitive emulsion to receive an image of said transparency; means for diverting light from said path between said transparency and emulsion to a second path; a photoelectric device in said second path exposed to all light traversing said second path and an inverse feedback loop interconnecting said photoelectric device and said control electrode, said loop including an adjustable clipping circuit for limiting the range of feedback voltage applied to said electrode.

7. Photographic masking apparatus according to claim 6 wherein said clipping circuit limits the minimum value of said voltage range.

8. Photographic masking apparatus according to claim 6 wherein said clipping circuit limits the maximum value of said voltage range.

9. Photographic masking apparatus according to claim 6 wherein said clipping circuit includes a diode with a variable bias voltage.

10. Photographic masking apparatus according to claim 6 wherein said clipping circuit includes a pair of diodes having variable bias voltages of opposite polarities.

11. A photographic masking method comprising scanning a color transparency with a cone of light and projecting a real image thereof on a photosensitive emulsion, diverting and sensing a portion of said light traversing said transparency and controlling the intensity of the scanning light as an inverse function of the intensity sensed, and introducing substantially complementary color filters in the paths of said image forming light and said sensed light respectively.

12. A photographic masking method comprising scanning a transparency with a cone of light from a single light source and exposing a photosensitive emulsion therewith through a transparency, diverting a portion of said light traversing said transparency, sensing all such diverted light with a photoelectric device, and controlling the intensity of the scanning light over a predetermined range as an inverse function of the intensity sensed by said photoelectric device to introduce masking effects, and adjusting said range to modify said masking effects.

13. A photographic masking method according to claim 12 wherein the minimum value of said range is adjusted.

14. A photographic masking method according to claim 12 wherein the maximum value of said range is adjusted.

15. Photographic masking apparatus according to claim 6 wherein said clipping circuit imparts to said voltage a characteristic having a curvilinear portion.

16. Photographic masking apparatus according to claim 6 wherein said clipping circuit imparts to said voltage a characteristic having a rectilinear portion.

References Cited in the file of this patent

UNITED STATES PATENTS

| | | |
|---|---|---|
| 2,480,425 | Simmon | Aug. 30, 1949 |
| 2,691,917 | Curry | Oct. 19, 1954 |
| 2,842,610 | Crosfield et al. | July 8, 1958 |
| 2,905,755 | Neale | Sept. 22, 1959 |
| 2,921,975 | Shapiro et al. | Jan. 19, 1960 |
| 2,927,520 | Craig | Mar. 8, 1960 |
| 2,968,214 | Kilminster | Jan. 17, 1961 |
| 2,987,571 | Allen et al. | June 6, 1961 |

UNITED STATES PATENT OFFICE
CERTIFICATE OF CORRECTION

Patent No. 3,115,807 December 31, 1963

Dwin R. Craig et al.

It is hereby certified that error appears in the above numbered patent requiring correction and that the said Letters Patent should read as corrected below.

Column 3, line 20, for "peripheral" read -- principal --.

Signed and sealed this 2nd day of June 1964.

(SEAL)
Attest:

ERNEST W. SWIDER
Attesting Officer

EDWARD J. BRENNER
Commissioner of Patents